(12) United States Patent
Hintz (10) Patent No.: US 9,316,759 B2
(45) Date of Patent: Apr. 19, 2016

(54) CAVITY ANOMALY DETECTION DEVICE

(71) Applicant: Kenneth J Hintz, Fairfax Station, VA (US)

(72) Inventor: Kenneth J Hintz, Fairfax Station, VA (US)

( * ) Notice: Subject to any disclaimer, the term of this patent is extended or adjusted under 35 U.S.C. 154(b) by 1 day.

(21) Appl. No.: 14/267,989

(22) Filed: May 2, 2014

(65) Prior Publication Data

US 2015/0285628 A1    Oct. 8, 2015

Related U.S. Application Data

(60) Provisional application No. 61/819,675, filed on May 6, 2013.

(51) Int. Cl.
*G01F 23/00*   (2006.01)
*G01V 5/00*    (2006.01)

(52) U.S. Cl.
CPC .................... *G01V 5/0016* (2013.01)

(58) Field of Classification Search
CPC ...... G01N 23/16; G01N 23/222; G01N 23/02; G01V 5/0016; G01V 5/0008
See application file for complete search history.

(56) References Cited

U.S. PATENT DOCUMENTS

| | | | | |
|---|---|---|---|---|
| 4,582,993 A * | 4/1986 | Bhattacharya et al. | .... | 250/359.1 |
| 7,382,312 B2 | 6/2008 | Hintz | | |
| 8,599,061 B2 * | 12/2013 | Hintz | ............... | 342/90 |
| 2004/0101109 A1 * | 5/2004 | Shih et al. | .............. | 378/207 |
| 2008/0265878 A1 * | 10/2008 | Bousquet et al. | ............. | 324/238 |
| 2009/0059226 A1 * | 3/2009 | Kajiki et al. | .............. | 356/328 |
| 2009/0290680 A1 * | 11/2009 | Tumer et al. | .................. | 378/62 |
| 2011/0103548 A1 * | 5/2011 | Bendahan | ........................ | 378/57 |
| 2011/0129063 A1 * | 6/2011 | Bendahan | ........................ | 378/57 |

* cited by examiner

*Primary Examiner* — David Porta
*Assistant Examiner* — Mamadou Faye (57) ABSTRACT

An apparatus may detect an anomaly in a cavity in an object. The apparatus may comprise an array, a signal processor, and a threshold excedent determination processor. The array may receive an intensity reduced transmission beam of energy resulting from an irradiating beam of energy passing through an object having a cavity and a cavity wall. The cavity may be defined by the cavity wall. The array may have sensors. The signal processor may receive a measurement of the intensity reduced transmission beam; determine a thickness of the cavity wall; estimate an absorption rate of cavity wall; compute a predicted measurement employing the thickness and absorption rate; and calculate a cavity anomaly statistic for a cavity anomaly employing the predicted measurement and the measurement. The threshold excedent determination processor may generate a notification when the cavity anomaly statistic exceeds a threshold.

20 Claims, 7 Drawing Sheets

CAVITY ANOMALY DETECTION DEVICE

CROSS-REFERENCE TO RELATED APPLICATIONS

This application claims the benefit of U.S. Provisional Application No. 61/819,675, filed May 6, 2013, entitled "Cavity Anomaly Detection Device," which is hereby incorporated by reference in its entirety.

BACKGROUND

There is a need for an apparatus and method to detect narcotics, weapons, explosives, or other contraband that may be concealed in cavities of common objects such as bicycles, strollers, or wheelchair frames or other difficult to inspect objects. Inspectors require reliable and easy-to-use tools that can quickly provide a general primary screening of these items to determine if a usually perceived cavity is empty or dense.

BRIEF DESCRIPTION OF THE SEVERAL VIEWS OF THE DRAWINGS

Example

Example

Example

Example

Example

Example

Example

Example

DETAILED DESCRIPTION OF EMBODIMENTS

Some of the various embodiments of the present invention may measure an object comprising a cavity wall, a cavity, and contents residing in the cavity.

A cavity may comprise a hollow place, a void, an empty space within the object, a space within the object comprising a material that differs from the object material, and/or the like. A body may reside in some cavities. Other cavities may comprise a void (e.g., not occupied by visible contents; containing no matter; empty, unfilled, and/or the like). Cavities may have various geometries. These geometries may include, but are not limited to, symmetrical or asymmetrical cross sections. Symmetrical cross sections may be circularly symmetric, symmetric about one or more axes, and/or the like.

Measurements may be processed to detect whether there is a mass in a cavity or whether the cavity is empty. Some embodiments may be configured to also classify the content if it is not void. Embodiments may be configured to measure the amount of material filling a cavity of numerous other objects including many non-military items such as chemical tanks, luggage, bottles, etc. Some of the various embodiments may also be employed as an adjunct processor to security scanning x-ray devices to determine whether a cavity containing objects, which may not be easily opened, contains material which is deserving of a more detailed inspection.

Energy sensors may convert incident energy into electrical signals such as voltage or current. Energy sensors which cover a small surface area may be arranged in one dimensional lines to produce a linear array of intensity measurement sensors. While the orientation of these linear sensors is usually straight, that is not a requirement and surfaces with arrays of sensors may be curved, curvilinear, or conformal on a three dimensional surface. Energy sensors which cover a small surface area may also be arranged to produce a planar array of intensity measurement sensors in two dimensions. These planar arrays may be considered as two dimensional arrays of linear arrays. The term array does not limit the dimensionality to any particular number and this concept of sensor arrays may be expanded to fill three spatial dimensions as well as additional temporal dimensions.

Examples of energy sensors include flat panel detectors (FPDs) and high-density line-scan solid state detectors. FPDs may include Indirect FPDs and Direct FPDs. Indirect FPDs convert x-rays to light and may include amorphous silicon (a-Si) detectors with a scintillator in the detector's outer layer, which may be made from cesium iodide (CsI) or gadolinium oxysulfide ($Gd_2O_2S$), also known as gadolinium sulfoxylate, GOS, or Gadox. Because of this conversion, the a-Si detector may be considered an indirect imaging device. The light may be channeled through the a-Si photodiode layer where it is converted to a digital output signal. The digital signal may be read out by thin film transistors (TFTs) or fiber-coupled charge coupled devices (CCDs) and provided to computing equipment for display, analysis, and/or the like. Direct FPDs may convert x-ray photons directly into a charge. Some Direct FPDs comprise amorphous selenium (a-Se) with an outer layer of a flat panel typically being a high-voltage bias electrode. X-ray photons may create electron-hole pairs in a-Se, and the transit of these electrons and holes depends on the potential of the bias voltage charge. As the holes are replaced with electrons, the resultant charge pattern in the selenium layer may be read out by a TFT array, active matrix array, electrometer probes, microplasma line addressing, and/or the like.

An additional example of an x-ray sensor is a high-density line-scan solid state detector composed of a photostimulable barium fluorobromide doped with europium (BaFBr:Eu) or cesium bromide (CsBr) phosphor. The phosphor detector may record the x-ray energy during exposure and may be scanned by a laser diode to excite the stored energy which is released and read out by a digital image capture array of a CCD.

Different forms of energy may be used to excite an object before the reflected, refracted, scattered, or transmitted energy is sensed by a sensor array. In particular, the energy released from a source of energy may be referred to as a transmitted beam of energy. The transmitted beam of energy may be directed towards an object to be sensed. The transmitted beam of energy may be focused or not focused depending on the detection sidelobes of the individual sensors which make up the linear array. This transmitted beam of energy when used to illuminate or excite an object may be termed an irradiating beam of energy.

Anything physical may be considered to be an object. Depending on the physical characteristics of the irradiating beam of energy, different interaction phenomenology may occur which produce a sensible result, meaning a conversion from the energy interacting with the sensor into an electrical voltage or current. For consideration here, an object may be considered to be anything having mass. An empty cavity is one which contains no mass other than, for example, possibly low density gas.

Since one use of the embodiment may be to determine whether a cavity contains any material, i.e., any liquid or solid, the void space within the object may be referred to as being the cavity under inspection since it is the cavity whose emptiness is being determined. While the cavity under inspection may generally be considered to be entirely contained within the object, it is possible that portions of the cavity may be open to the outside and that the cavity is not completely closed within the object.

Associated with the irradiating beam of energy may be a measure of the irradiating beam's intensity. The absolute value of this irradiating beam intensity may need to be sufficiently intense so as to produce an observable result in the sensor of both the object and the cavity. A factor of interest may be the decrease in intensity which occurs as a result of the irradiating beam of energy interacting with the object and the cavity inside the object. The result of this interaction may result in a reduction in the intensity of the irradiating beam leading to an intensity reduced irradiating beam of energy whose intensity may be measured by the energy sensor.

The result of the interaction of the intensity reduced irradiating beam of energy with the linear array of intensity measurement sensors, which produce voltage or current values for each sensor in the array, may be a numerical valued array of measurement values. This array of numerical values may be referred to as a reduced irradiating beam intensity measurement. This array of numerical values may be input into a signal processor which computes other numerical values to determine whether there is material within the cavity.

Figure 1:
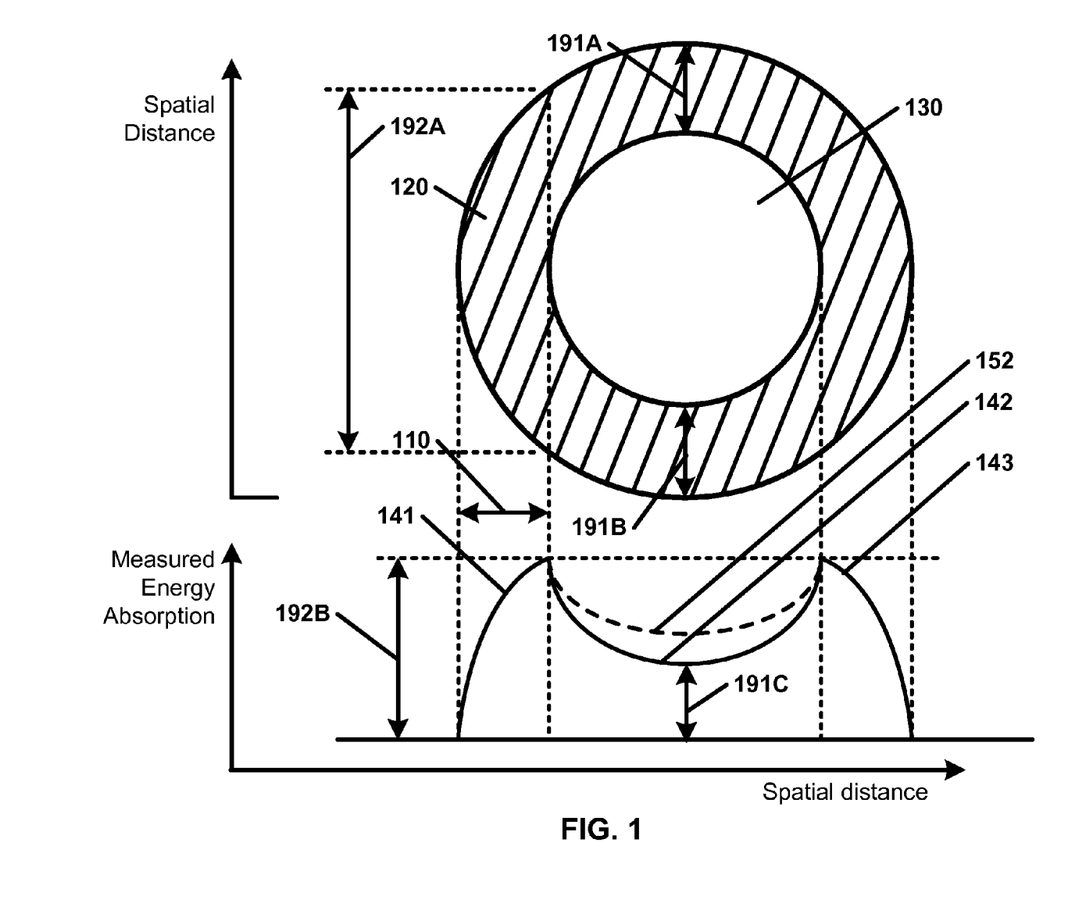
FIG. 1 is a diagram illustrating observable absorption signals in a line scan transmission of energy through an object with a void as per an aspect of an embodiment of the present invention.

Example FIG. 1 is an illustrative diagram showing observable absorption signals in a line scan transmission of energy through an object 120 with a cavity 130 as per an aspect of an embodiment of the present invention. Were the cavity 130 to be filled, the dashed line 152 would be expected. If the cavity 130 contained no mass (e.g. energy absorbing or scattering material), solid line 142 would be expected.

Figure 2:
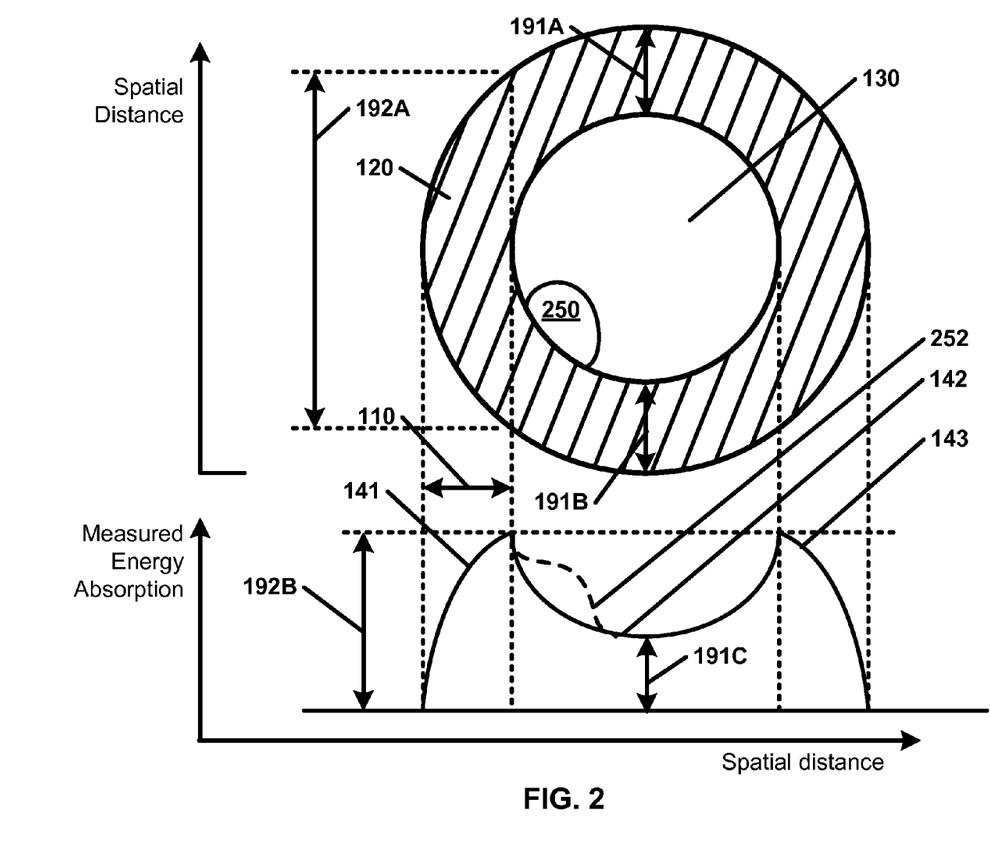
FIG. 2 is a diagram illustrating observable absorption signals in a line scan transmission of energy through an object with a partially filled void as per an aspect of an embodiment of the present invention.

Example FIG. 2 is an illustrative diagram showing observable absorption signals in a line scan transmission of energy through object 120 with cavity 130 partially filled. Were the cavity 130 to be partially filled with material 250, the dashed line 252 would be expected. If the cavity 130 contained no mass, solid line 142 would be expected.

In order for a numerical signal processor to determine whether a cavity 130 contains material 250, the thickness of the wall 110 of the container 120 may be computed. For the sake of exposition, but without adding any limitations to the geometry which may be analyzed by the procedure, reference is made to FIGS. 1 and 2. The following terms are defined by example as shown in FIGS. 1 and 2. The first thickness 110 (wall thickness) may be the spatial distance from no absorption on the left to the peak of absorption (shown having a measured energy absorption 192B for an energy beam traveling through object 120 for a spatial distance 192A). This first thickness 110 (spatial distance) may be the thickness of the cavity wall 120 which, in this example, completely and uniformly encloses cavity 130. It is the ring 120 around the circle in the center which contains cavity 130. Again with reference to FIG. 1, a first absorption rate (absorption per unit thickness) may be computed from the shape of the curvature 141 of the absorption leading to the peak absorption and the spatial thickness 110 also measured to the peak.

Given the absorption rate and the wall thickness 110, the net absorption for this example may be computed if the net amount of wall that the illuminating energy travels through is only twice the direct wall thickness (e.g. absorption 191C for energy traveling through object 120 at 191A and 191B) since there may be no absorption in a void cavity 130. This computed absorption may lead to the predicted irradiating beam of energy absorption 142.

The actual numerical values in the reduced irradiating beam intensity measurement may be used without modification or may be filtered and normalized to yield a measured irradiating beam of energy absorption. If the cavity 130 is not empty, a measured irradiating beam of energy absorption may appear as the two curved areas to the left 141 and right 143 of 142, but with the increased absorption in the cavity area 130 as shown by the dashed line 152.

With reference now to FIG. 2, since a void cavity 130 may be expected to contain no mass, the detection of mass 250 within cavity 130 may be considered an anomaly. This anomaly may be assigned a numerical value based on the difference between the predicted and measured absorptions in the cavity area 130. This numerical value may be the cavity anomaly measure. One example of the anomaly measure is the integral difference between the solid predicted line 142 and dashed line 252 of FIG. 2. A numerical threshold may be chosen to set a false alarm rate and a probability of detection. This threshold numerical value may be used to provide a human sensible visual or audible notifying signal and/or an electronic notification to another device. This threshold exceedance may be determined by a threshold excedent determination processor which may output a notification when a predetermined (numerical) value of the cavity anomaly measure is exceeded.

While the proceeding discussion has been focused on irradiating energy that is attenuated while passing through an object and cavity on its way to an energy sensor, the computational methodology outlined above may also be applied to energy which does not pass through the object and cavity, but is actually reflected from the interfaces between the different materials. In general, these interfaces between dissimilar materials may be referred to as impedance discontinuities. Impedance is the complex ratio between two different parameters of a propagating signal. In the case of electromagnetic energy, the impedance may be defined as the complex voltage divided by the complex current. In the case of acoustics, the impedance may be defined as the complex pressure divided by the complex velocity of the acoustic propagating signal. In general, an impedance may be characterized by a change in index of refraction or propagation velocity. An impedance discontinuity may be a discontinuity in the propagation characteristics of energy through one or more objects.

At each impedance discontinuity, some energy may be reflected and some energy may continue through the object(s) and/or cavit(ies). This reflected beam of energy may be sensed by an energy detector spatially and/or temporally. A change in intensity over time may be correlated with a change in intensity over physical space.

Electromagnetic waves at different wavelengths may exhibit different capabilities to penetrate various materials. A commonly known penetrating electromagnetic wave is x-rays, but there are others such as radio waves and neutrons. Sound waves are well known in physics and may not be limited to those audible to humans. There are higher frequency sound waves referred to as ultrasonic frequencies which, because of their short wavelengths, may be more readily focused to produce a collimated beam which may propagate as an irradiating beam of energy just as with x-rays. These collimated beams may produce a higher resolution line scan in some linear sensor arrays.

Spatial measurements may refer to physical two dimension and three dimension space independent of the coordinate system in which they are expressed. A linear sensor array may be used to map a sensor space into a physical space of an object and cavity under investigation through appropriate transform(s) known in the art. Temporal measurements may refer to multiple spatial or intensity or absorption measurements taken over a period of time and at discrete intervals.

X-ray sensitive emulsion may be a photographic film which may turn opaque when illuminated with x-rays or other ionizing electromagnetic radiation. As such, the opacity may be converted by electronic or photographic apparatus and/or process to an intensity measurement array for subsequent processing by a signal processor. In addition to photographic or other film, semiconductors and other types of detectors may be employed for sensing and assigning numerical values to the intensity of the energy which impinges on a sensor.

Additional embodiments may be used to estimate the internal structure of an object and cavity. Embodiments may be configured to measure refraction and other effects associated with impedance discontinuities.

One skilled in the art may develop an analytical expression relating the sensor space to the physical space. However the same (or similar) relationship may be empirically derived from a series of measurements. The resulting empirical data may be used to create a look-up-table (LUT) configured to be used to classify potential masses within the cavities based on their energy absorption properties.

Alternative embodiments may be configured to respond to cavities of different geometries. These geometries can include symmetrical or asymmetrical cross sections. Symmetrical cross sections can be either circularly symmetric or simply symmetric about one or more axes.

Figure 3:
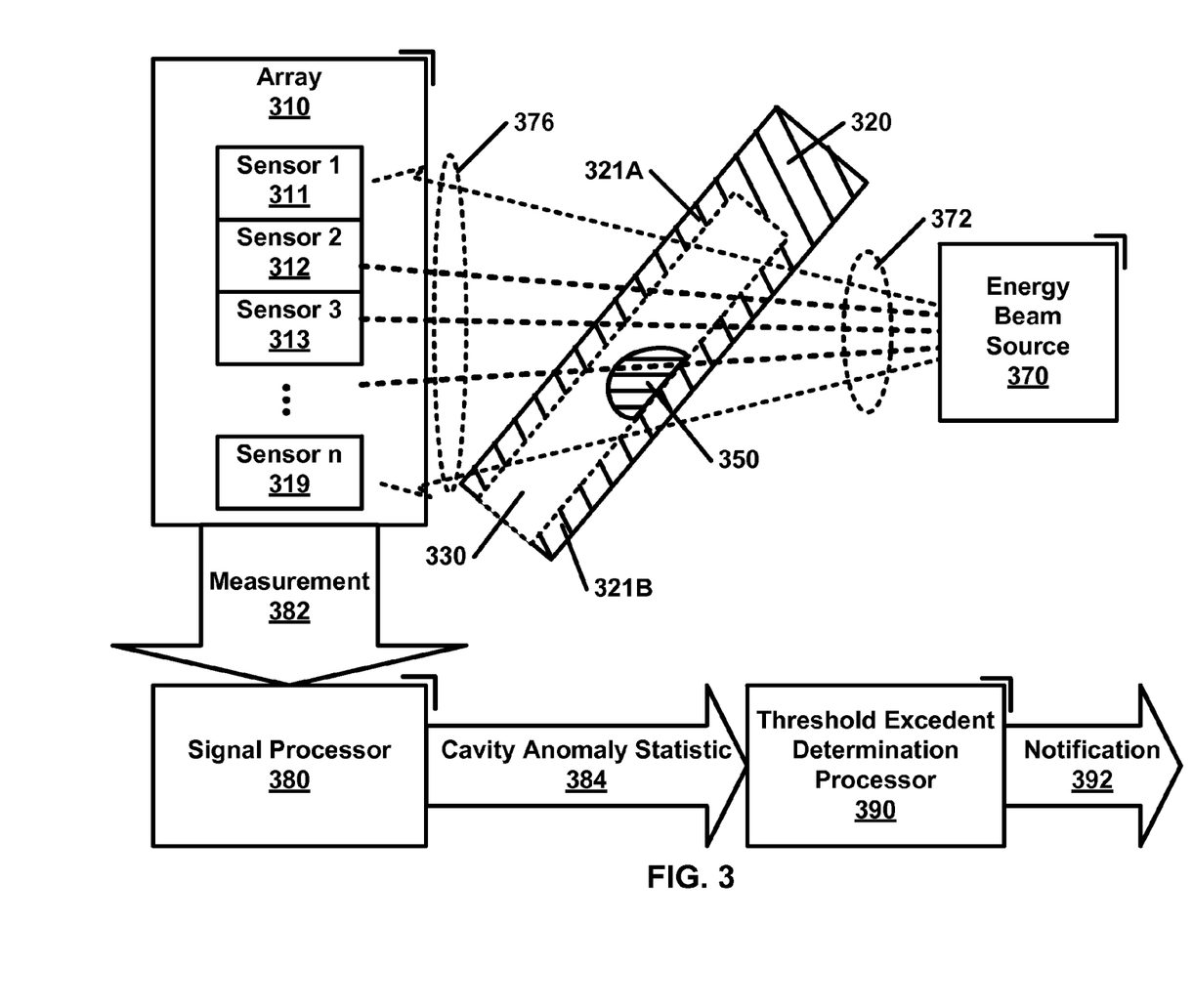
FIG. 3 is a block diagram illustrating an aspect of an embodiment of the present invention employing an energy beam traveling through an object containing a cavity.

Embodiments of the present invention may be employed to detect an anomaly in a cavity in an object. Example FIG. 3 is a block diagram illustrating an aspect of an embodiment of the present invention employing an energy beam 372, from energy beam source 370, traveling through an object 320 with a cavity 330. As illustrated in example FIG. 3, an apparatus may comprise an array 310, a signal processor 380, and a threshold excedent determination processor 390. The array 310 may receive an intensity reduced transmission beam of energy 376 resulting from an irradiating beam of energy 372 passing through object 320. Object 320 may have a cavity 330 and cavity wall (illustrated as 321A and 321B). The cavity 330 may be defined by the cavity wall (illustrated as 321A and 321B). The array 310 may have sensors (311, 312, 313 . . . 319). The signal processor 380 may receive a measurement 382 of the intensity reduced transmission beam 376; determine a thickness of the cavity wall (illustrated as 321A and 321B); estimate an absorption rate of cavity wall (illustrated as 321A and 321B); compute a predicted measurement employing the thickness and absorption rate; and calculate a cavity anomaly statistic 384 for a cavity anomaly employing the predicted measurement and the measurement 382. The threshold excedent determination processor 390 may generate a notification 392 when the cavity anomaly statistic exceeds a threshold.

The cavity 330 may be empty (void) and/or the cavity 330 may have a body (or other material) 350 inside. A cavity anomaly may be the result of a body 350 in the cavity 330. The body 350 may be a material 350 that differs from the cavity 330 material. Examples of objects 320, cavities 330, and materials 350 include, but are not limited to: a bicycle frame tube with an illegal substance inside, a bicycle frame tube with a manufacturing defect, a loaded gun barrel, a partially filled food container, and/or the like. Some cavity anomalies may be caused by irregular cavities 330. An example of an irregular cavity 330 may include a pipe with a dent and/or broken section.

A cavity anomaly may be the result of at least one impedance discontinuity. An impedance discontinuity may be the result of a junction between two different materials. Such junctions may be the result of one or more bodies (and/or other materials) 350 in the cavity 330. For example, when the body 350 is of a material that differs from the cavity 330 material.

The thickness of a cavity wall (321A and/or 321B) may be determined many ways. For example, a cavity wall (321A and/or 321B) may be physically measured. The thickness of a cavity wall (321A and/or 321B) may be determined through a specification for a part such as a tube, a pipe, a canister, weapon, and/or the like. The thickness of a cavity wall (321A and/or 321B) may also be determined using a device to determine distances between impedance discontinuities. An example of how to perform such a measurement is disclosed in U.S. Pat. No. 7,382,312 B2 to Hintz, entitled "Syntactic Target Classifier."

The energy beam source 370 may be configured to generate energy beam 372. The energy beam source 370 may be configured to generate, for example, a heterogeneous beam of x-rays employing an x-ray generator projected toward object 320. A certain amount of energy beam 372 may be absorbed by object 320, which may be dependent on the particular density and composition of object 320. According to some of the various embodiments, energy beam 372 may include an irradiating signal which contains one frequency. According to other embodiments, energy beam 372 may include an irradiating signal which contains multiple frequencies in a single transmitted waveform such as, but not limited to, a chirp signal. Additionally, an irradiating signal may include random pseudo-random or deterministic frequency components transmitted in a random, pseudo-random, or deterministic order. Usable wavelengths for energy beam 372 may be at least those wavelengths which are capable of penetrating object 320

According to some of the various embodiments, the energy beam 372 may include electromagnetic radiation (EMR). EMR is a phenomenon of electromagnetism, behaving as waves propagating through space, and also as photon particles traveling through space, carrying radiant energy. In a vacuum, EMR may propagate at a characteristic speed, the speed of light, normally in straight lines. EMR may be emitted and absorbed by charged particles. As an electromagnetic wave, EMR may have both electric and magnetic field components, which oscillate in a fixed relationship to one another, perpendicular to each other and perpendicular to the direction of energy and wave propagation.

EMR may be produced when charged particles are accelerated by forces acting on them. Electrons may be responsible for emission of most EMR because they have low mass, and therefore are easily accelerated by a variety of mechanisms. Quantum processes may also produce EMR, such as when atomic nuclei undergo gamma decay, and processes such as neutral pion decay.

EMR may carry energy—sometimes called radiant energy—through space continuously away from a source (this is not true of the near-field part of the EM field). EMR may also carry both momentum and angular momentum.

These properties may all be imparted to matter with which it interacts. EMR may be produced from other types of energy when created, and it is converted to other types of energy when it is destroyed.

Examples of electromagnetic frequencies which may be employed by various embodiments include, in order of increasing frequency and decreasing wavelength: radio waves, microwaves, infrared radiation, visible light, ultraviolet radiation, x-rays and gamma rays.

The array 310 may comprise one or more arrays of sensors (311, 312, 313 . . . 319), sometimes referred to as a sensor array, configured to receive energy beam 376. A sensor array 310 may comprise a group of sensors (311, 312, 313 . . . 319) deployed in a pattern, for example, a geometric pattern. According to the various embodiments, the array of sensors (311, 312, 313 . . . 319) may be configured in many different configurations. For example, the array 310 could be configured with at least one linear array. A linear array may include a series of sensors (311, 312, 313 . . . 319) arranged in a line. Alternatively, an array may be arranged to include at least one nonlinear array. A nonlinear array may include an array of sensors (311, 312, 313 . . . 319), where at least one of the sensors (311, 312, 313 . . . 319) is located in a position that is not linearly aligned with the other sensors. Other types of arrays may include two dimensional arrays and/or three dimensional arrays. In these configurations, the sensors (311, 312, 313 . . . 319) may be arranged over a two dimensional and/or three dimensional space. For example, a two dimensional array may include a series of sensors (311, 312, 313 . . . 319) arranged in a two dimensional grid pattern. An example of a three dimensional array may include a curvilinear array where a series of sensors (311, 312, 313 . . . 319) are arranged along a curve in three dimensional space or are conformal on a non-planar surface. Other three dimensional arrays may include sensors (311, 312, 313 . . . 319) arranged in a grid pattern over a three dimensional space. Using a sensor array 310 in a two and/or three dimensional configuration may assist in increasing antenna gain in the direction of the signal while decreasing the gain in the directions of noise and interferences. In other words, sensor arrays may increase signal. Using a sensor array 310 in a two and/or three dimensional configuration may assist in decreasing the visibility of the array and lead to low observable methods of detecting anomalies.

According to some of the various embodiments, at least one of the sensors (311, 312, 313 . . . 319) may be configured to receive ionizing radiation. Examples of ionizing radiation include: alpha-rays, beta-rays, x-rays, gamma-rays, and/or the like. Some of the sensors (311, 312, 313 . . . 319) may be part of an imaging system such as a dental x-ray device, a fluoroscopic imaging device, and/or the like. Similarly, according to some of the various embodiments, at least one of the sensors (311, 312, 313 . . . 319) may be configured to receive electromagnetic waves, acoustic waves, ultrasonic signals, and/or the like.

Some sensors (311, 312, 313 . . . 319) may be configured to receive electromagnetic radiation 376 to view the internal structure of object 320. Electromagnetic radiation 376 may be the result of energy beam 372 (created by energy beam source 370 and projected toward object 330) interacting with object 330. According to some of the various embodiments, at least one of the sensors (311, 312, 313 . . . 319) may comprise at least one intensity sensor. An intensity sensor is a sensor that produces one or more values proportional to the amplitude of a measured signal. The value may be a linear value and/or a non-constant scaled value. To increase the dynamic range of a reported value, a logarithmically scaled value for a signal may be reported. Some intensity sensors may provide an intensity value that is range specific, wherein the range may be defined for a sub-range of frequencies within a larger range of frequencies.

According to some of the various embodiments, at least one of the sensors (311, 312, 313 . . . 319) may comprise at least one frequency selective sensor. A frequency selective sensor is a sensor that effectively filters out all frequencies other than a selected frequency. Some of these sensors may employ low-pass filters, high-pass filters, band-pass filters, programmable filters, and/or the like. Some frequency selective sensors may be selective based upon their physical characteristics.

A frequency selective sensor may include a frequency selective electromagnetic wave receiver configured to receive electromagnetic signal 376. Various embodiments may use different signal receivers that are compatible with the signal processing methodology used. For example, the signal receiver may be a frequency selective signal receiver configured to be used in temporally determining frequency specific signal statistics. According to some embodiments, the frequency selective signal receiver may be configured to sweep continuously or discretely step over a prescribed bandwidth and receive wavelengths which have been affected by the interaction with object 320 and cavity 330. A frequency selective signal receiver is a receiver that can distinguish between signals received at different frequencies. As a second example, the signal receiver may be a wider bandwidth signal receiver configured to be used in simultaneously determining signal statistics.

According to some of the various embodiments, at least one of the sensors (311, 312, 313 . . . 319) may comprise at least one temporal gated sensor. A temporal gated sensor is a sensor that can capture sensor data during specific time intervals. A temporal gated sensor may be employed to measure energy or compute power by, for example, integrating power received in the sensor over a known duration of time.

Signal processor 380 may receive and process measurement(s) 382 from array 310 to produce a cavity anomaly statistic 384 indicative of a cavity anomaly in cavity 330. The signal processor 380 may include specialized processing hardware, firmware, software, combinations thereof, and/or the like. For example, a computing system such as disclosed with relation to FIG. 7 may be employed with such elements. The signal processor may include array signal processing that account for values from multiple sensors (311, 312, 313 . . . 319) in converting measurements 382 into a cavity anomaly statistic 384. Using array signal processing, the temporal and spatial properties (or parameters) of signals 376 collected by sensor array 310 sensor elements (311, 312, 313 . . . 319) may be estimated and revealed. As such, the at least one signal processor may also be configured to receive temporal measurements 382.

According to some of the various embodiments, the signal processor 380 may estimate an absorption rate of the cavity wall (321A and/or 321B) based on experimental data, material specific absorption per unit area data, and/or the like. The estimated absorption rate may also be provided to signal processor 380. The absorption rate may vary depending upon material and/or transmission beam 376 characteristics. For example, some materials may absorb high frequency signals at a rate greater than low frequency materials. The contrary may also be true—that some materials may absorb low frequency signals at a rate greater than high frequency materials.

According to some of the various embodiments, the signal processor 380 may calculate a predicted measurement employing the cavity wall (321A and/or 321B) thickness and the absorption rate associated with the cavity wall (321A and/or 321B) characteristics. The predicted measurement may predict the attenuated energy beam 376 that each sensor (311, 312, 313 . . . 319) may receive after energy beam 372 traverses through object 320 without an anomaly. This prediction may account for the specific path that energy beam 372 takes as it traverses through object 320 to reach each sensor (311, 312, 313 . . . 319), including the specific geometry (e.g. cavity wall thicknesses and their associated absorption rates).

According to some of the various embodiments, the signal processor 380 may also calculate cavity anomaly statistic 384 for a cavity anomaly employing the predicted measurement and the measurement 382. The cavity anomaly statistic 384 may comprise at least a difference between the predicted measurement and the actual measurement 382 taken from the array 310 of sensors (311, 312, 313 . . . 319). The difference may be employed in, for example, an integral sum or other type of formulaic calculation. Various types of differences may be employed such as, for example, mean difference, variances, a standard deviation, the mean sum squared errors of differences, squared differences, combinations thereof, and/or the like. A cavity anomaly statistic 384 may also employ ratio(s) of predicted and measured values at each (or a subset) element of the array 310. It can readily be seen by one skilled in the art that there are a large number of different statistics that may be computed on measurement(s) 382 to determine whether a cavity anomaly exists.

The threshold excedent determination processor 390 may be configured to generate a notification 392 when the cavity anomaly statistic 384 exceeds a threshold. A threshold may comprise, for example, at least one adaptive threshold, at least one predetermined threshold, a combination thereof, and/or the like. An adaptive threshold may change over time based upon changing conditions and/or requirements. For example, as an object 320 is rotated, the threshold may need to increase or decrease to provide an accurate result. Additionally, the threshold may adapt to various measurement configurations, sensors, sensor placements, signal processors, combinations thereof, and/or the like.

The threshold may include at least one value. The value may be predetermined or dynamically determined. Dynamically determined threshold(s) may be based on at least one cavity anomaly statistic(s) 384. The threshold may also include a multi-variable function. James & James, *Mathematics Dictionary*, 1966 defines: "A function of one variable is a function which has only one independent variable." "A function of several variables [multi-variable] is a function which takes on a value or values corresponding to every set of values of several variables (called the independent variables)."

The notification 392 may be a message, a signal, an alert, a combination thereof, and/or the like. The notification 392 may be presented to user through a network, a transducer, a graphical user interface, a combination thereof, and/or the like. The notification may be accompanied with information describing the anomaly and/or the cavity anomaly statistic. Information describing the anomaly may include statistical information, imaging information, timestamp information, a combination thereof, and/or the like. The notification 392 may also contain audio or other perceivable components.

Figure 4:
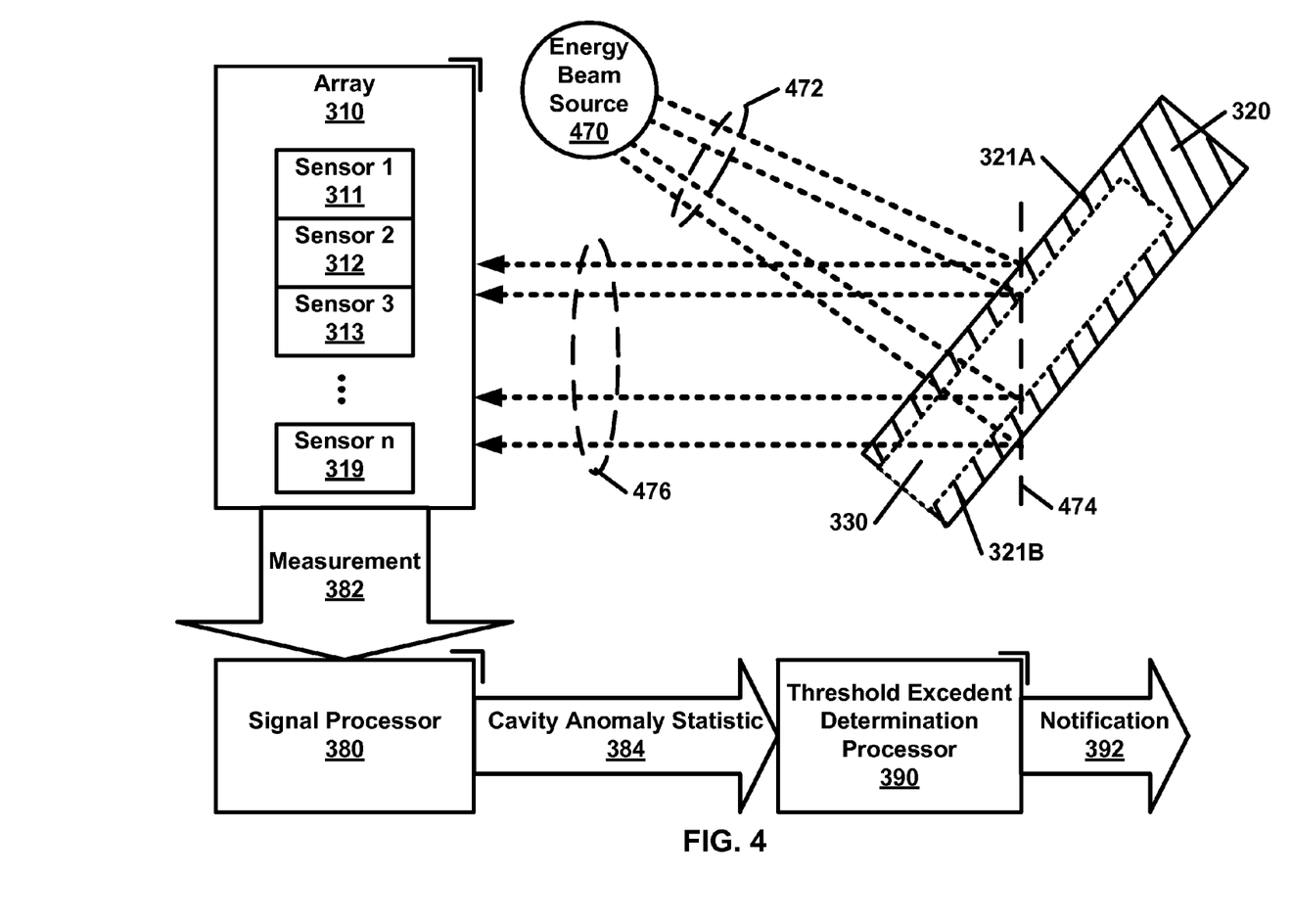
FIG. 4 is a block diagram illustrating an aspect of an embodiment of the present invention employing a reflected energy beam traveling through an object containing a cavity.

Example FIG. 4 is a block diagram of an aspect of an embodiment of the present invention employing a reflected energy beam 476 that traveled through an object 320 with a cavity 330. As illustrated in this example embodiment, an energy beam source 470 produces an irradiating energy beam 472 directed towards object 320 comprising at least a cavity 330 and a cavity wall (321A and/or 321B). The beam 472 may be reflected by various locations on and/or in an object 320. Although this reflection is illustrated along imaginary vertical 474 for illustrative purposes, the reflection may be more comprehensive and continuous to cover the structure of object 320 within the beam-width of beam 472. Some of the reflection components may be at points of impedance discontinuity (e.g. the interface between parts and materials along and within object 320). At each impedance discontinuity, some energy may be reflected and some energy may continue through the structure of object 320 and/or cavity 330. This reflected beam of energy 476 may be sensed by array 310. Change in intensity of beam 476 over time may be correlated with a change in intensity over physical space.

According to some of the various embodiments, array 310 may be configured to receive at least one "reflected" irradiating beam 476 attenuated by object 320, including any other bodies, materials, or imperfections contained therein. The array 310 may receive this signal and communicate the measurements 382 to signal processor 380 as discussed earlier.

Figure 5A:
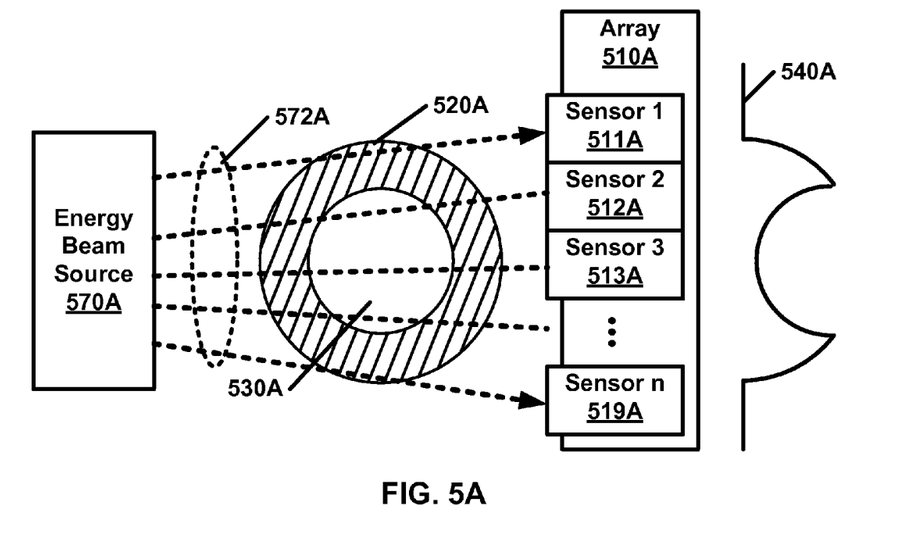
FIG. 5A is block diagram illustrating an array employed as per aspects of an embodiment of the present invention.

Example FIG. 5A is block diagram of an array 510A employed as per aspects of an embodiment of the present invention. Specifically, this illustrative example is similar to the embodiment illustrated in FIG. 3 with the notable exception that object 520A is a cylindrical shaped object with cavity 530A. An energy beam source 570A may produce an energy beam 572A directed at object 520A. The beam 572A may be received by linear array 510A which includes a series of sensor elements (511A, 512A, 513A . . . 519A). Plot 540A may represent observable absorption signals of the transmission of energy 572A through object 520A with cavity 530A as measured by linear array 510A.

Figure 5B:
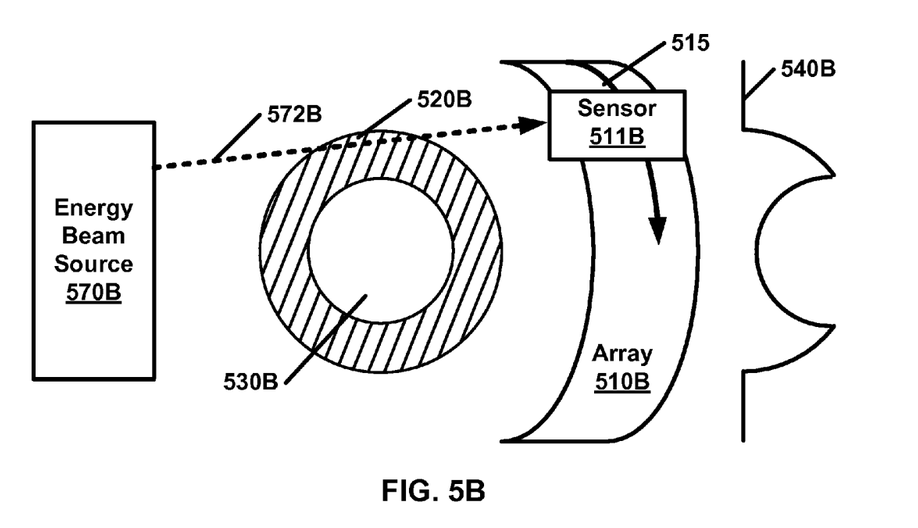
FIG. 5B is block diagram illustrating an alternative array configuration employed as per aspects of an embodiment of the present invention.

Example FIG. 5B is block diagram of an alternative array 510B configuration employed as per aspects of an embodiment of the present invention. Specifically, this illustrative example is similar to the embodiment illustrated in FIG. 5A with the notable exception that linear array 510A is replaced with array 510B that moves a single sensor 511B to receive a series of values in sequence that may be equivalent to the series of values received by static sensor elements (511A, 512A, 513A . . . 519A). An energy beam source 570B may produce an energy beam 572B directed at object 520B. The beam may be received by array 510B as sensor 511B moves along trajectory 515. During this trajectory 515, the sensor 511B may receive a series of values. Plot 540B may represent observable absorption signals of the transmission of energy 572B through object 520B with cavity 530B as measured by this linear array 510B with movable sensor 511B.

Figure 6:
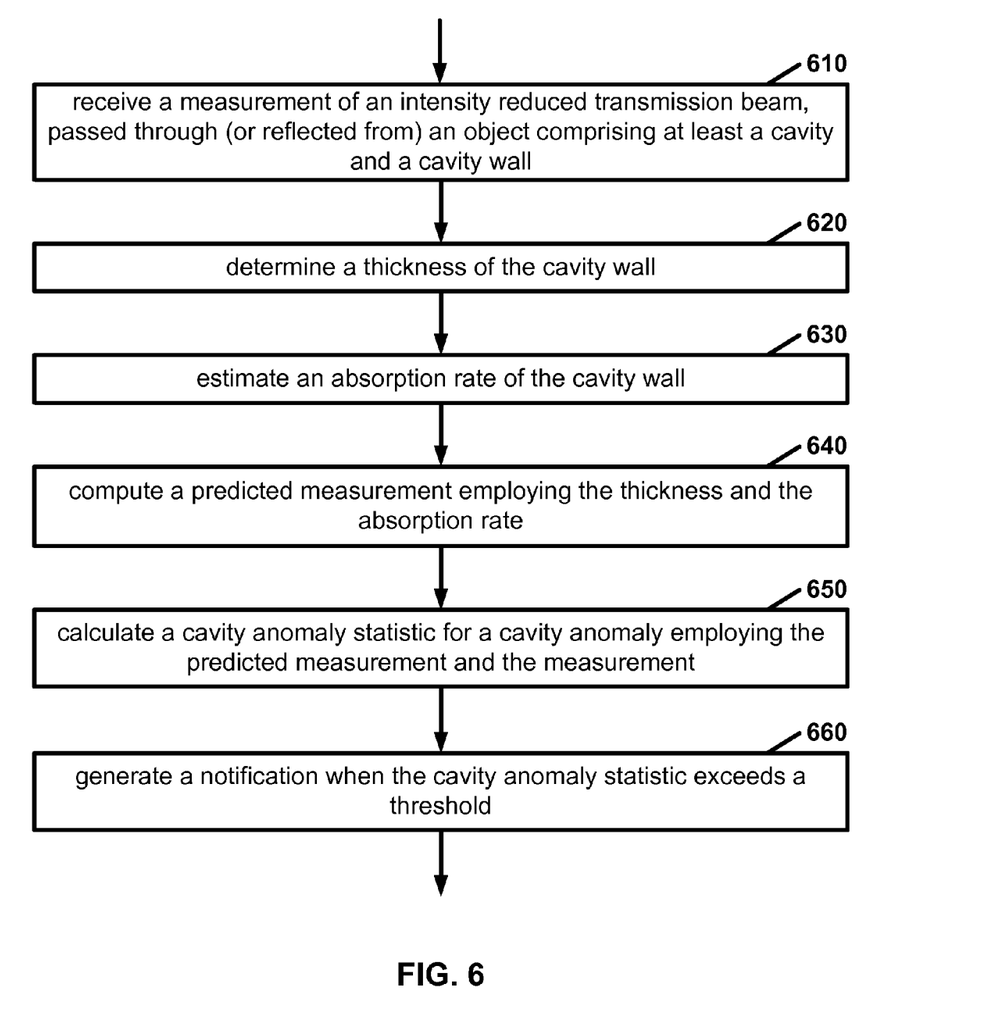
FIG. 6 is a flow diagram illustrating an aspect of an embodiment of the present invention.

Example FIG. 6 is a flow diagram of an aspect of an embodiment of the present invention. This process flow may be achieved through the use of specialized processing hardware, firmware, software, combinations thereof, and/or the like. For example, a computing system such as disclosed with relation to FIG. 7 may be employed with such elements to perform all or part of blocks 610 through 660. According to some of the various embodiments, the process may be embodied on a non-transitory computer readable medium as a series of machine executable instructions that when executed by one or more processors, causes the processors to execute the process described by all or part of blocks 610 through 660. In yet other embodiments, specialized hardware that may include circuit elements such as application-specific integrated circuits (ASIC), field programmable gate arrays (FPGA) and/or the like may be employed to perform all or part of blocks 610 through 660.

At 610, a measurement of an intensity reduced transmission beam passed through (or reflected from) an object comprising at least a cavity and a cavity wall may be received. A thickness of the cavity wall may be determined at 620. An absorption rate of the cavity wall may be estimated at 630. A predicted measurement employing the thickness and the absorption rate may be computed at 640. A cavity anomaly statistic for a cavity anomaly employing the predicted measurement and the measurement may be calculated at 650 and a notification when the cavity anomaly statistic exceeds a threshold may be generated at 660.

Figure 7:
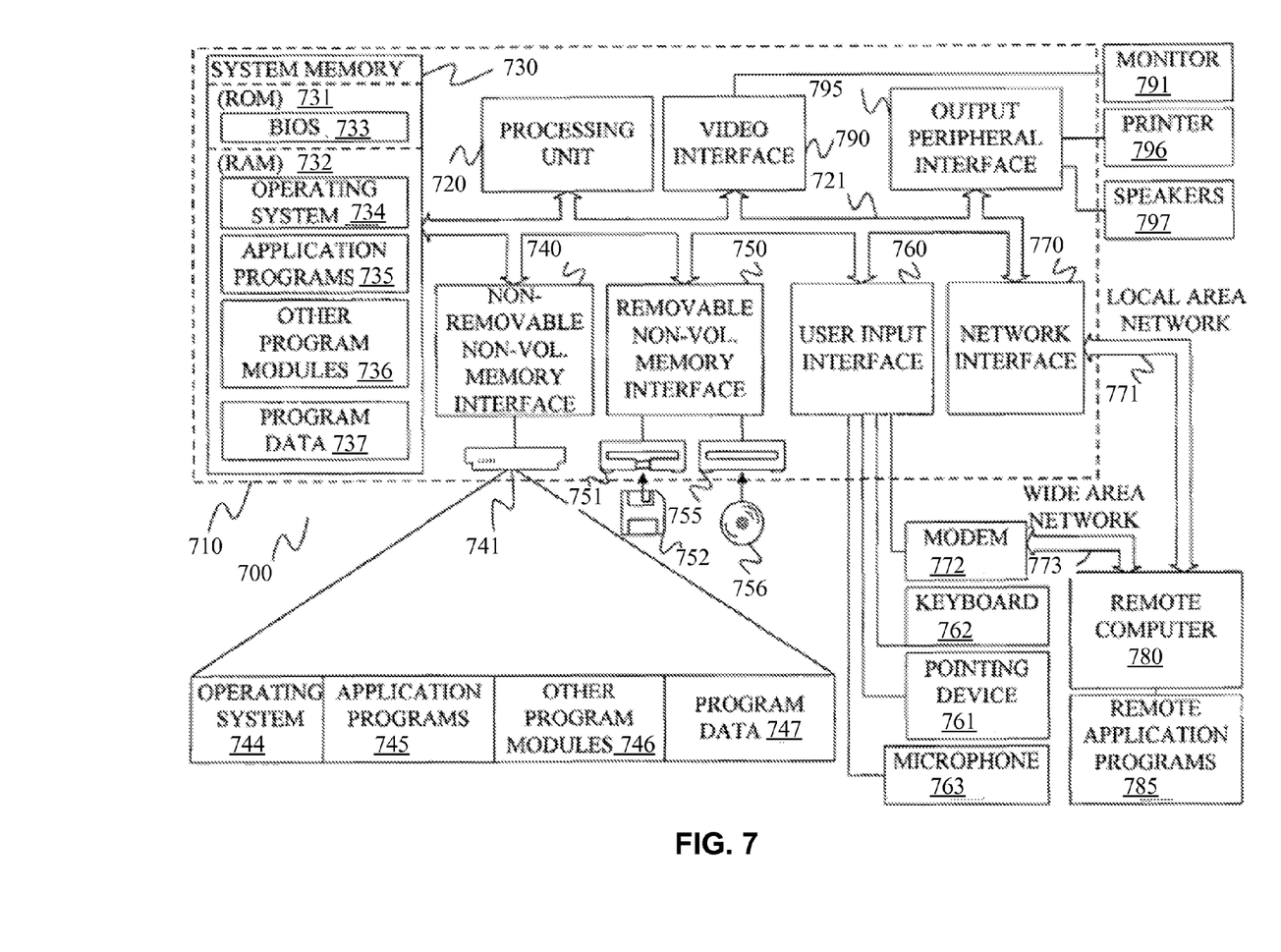
FIG. 7 is a block diagram illustrating a computing environment in which aspects of embodiments of the present invention may be practiced.

FIG. 7 illustrates an example of a suitable computing system environment 700 on which embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an example system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 730 includes computer storage media in the form of volatile and/or nonvolatile memory such as ROM 731 and RAM 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, program data 747, and other program modules 746. Additionally, for example, nonvolatile memory may include signal processing modules 380, threshold excedent determination processing module 390, combinations thereof, and/or the like.

A user may enter commands and information into the computer 710 through input devices such as a keyboard 762, a microphone 763, and a pointing device 761, such as a mouse, trackball or touch pad. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device may also connected to the system bus 721 via an interface, such as a video interface 790. Other devices, such as, for example, speakers 797 and printer 796 may be connected to the system via peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (such as C, C++, FORTRAN, Java, Basic, Matlab or the like) or a modeling/simulation program (such as Simulink, Stateflow, GNU Octave, or LabVIEW MathScript). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) detecting objects in a cavity. However, one skilled in the art will recognize that embodiments of the invention could be used to detect malformed cavities, unexpected cavities in a body (e.g. air bubbles in a casting), and/or the like.

In addition, it should be understood that any figures that highlight any functionality and/or advantages, are presented for example purposes only. The disclosed architecture is sufficiently flexible and configurable, such that it may be utilized in ways other than those shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. An apparatus comprising:
   a. at least one array configured to receive at least one intensity reduced transmission beam of energy resulting from an irradiating beam of energy passing through an object comprising at least a cavity and a cavity wall, said cavity defined by said cavity wall, said at least one array comprising at least one of sensors;
   b. a signal processor configured to:
      i. receive a measurement of said at least one intensity reduced transmission beam;
      ii. determine a thickness of said cavity wall;
      iii. estimate an absorption rate of said cavity wall;
      iv. compute a predicted measurement employing said thickness and said absorption rate; and
      v. calculate a cavity anomaly statistic for a cavity anomaly employing said predicted measurement and said measurement; and
   c. a threshold excedent determination processor configured to generate a notification when said cavity anomaly statistic exceeds a threshold.

2. The apparatus according to claim 1, wherein said at least one array comprises at least one linear array.

3. The apparatus according to claim 1, wherein said at least one array comprises at least one nonlinear array.

4. The apparatus according to claim 1, wherein said at least one array comprises at least one two dimensional array.

5. The apparatus according to claim 1, wherein said at least one array comprises at least one three dimensional array.

6. The apparatus according to claim 1, wherein said at least one array comprises at least one non-stationary array.

7. The apparatus according to claim 1, wherein at least one of said at least one sensor is configured to receive ionizing radiation.

8. The apparatus according to claim 1, wherein said at least one signal processor is configured to receive temporal measurements.

9. The apparatus according to claim 1, wherein said cavity anomaly is the result of a body in said cavity, said body comprising a material that differs from the cavity material.

10. The apparatus according to claim 1, wherein said cavity anomaly is the result of said cavity comprising at least one impedance discontinuity.

11. An apparatus, comprising:
   a. at least one array configured to receive at least one reflected irradiating beam attenuated by an object comprising at least a cavity and a cavity wall, said cavity defined by said cavity wall, said at least one array comprising at least one sensor;
   b. a signal processor configured to receive a measurement of said at least one reflected irradiating beam, said signal processor configured to:
      i. receive a measurement of said at least one reflected irradiating beam;
      ii. determine a thickness of said cavity wall;
      iii. estimate an absorption rate of said cavity wall;
      iv. compute a predicted measurement employing said thickness and said absorption rate; and
      v. calculate a cavity anomaly statistic for a cavity anomaly employing said predicted measurement and said measurement; and
   c. a threshold excedent determination processor configured to generate a notification when said cavity anomaly statistic exceeds a threshold.

12. The apparatus according to claim 10, wherein said at least one array comprises at least one linear array.

13. The apparatus according to claim 10, wherein said at least one array comprises at least one nonlinear array.

14. The apparatus according to claim 10, wherein said at least one array comprises at least one two dimensional array.

15. The apparatus according to claim 10, wherein said at least one array comprises at least one three dimensional array.

16. The apparatus according to claim 10, wherein said at least one array comprises at least one non-stationary array.

17. The apparatus according to claim 10, wherein at least one of said at least one sensor is configured to receive ionizing radiation.

18. The apparatus according to claim 10, wherein at least one signal processor is configured to receive temporal measurements.

19. The apparatus according to claim 10, wherein said cavity anomaly is the result of a body in said cavity, said body comprising a material that differs from the cavity material.

20. The apparatus according to claim 10, wherein said cavity anomaly is the result of said cavity comprising at least one impedance discontinuity.

\* \* \* \* \*